United States Patent
Shamim et al.

(10) Patent No.: US 11,264,788 B2
(45) Date of Patent: Mar. 1, 2022

(54) POWER CONTROL WITH DETECTION OF OVERCURRENT EVENTS

(71) Applicant: HEWLETT-PACKARD DEVELOPMENT COMPANY, L.P., Spring, TX (US)

(72) Inventors: Asjad Shamim, Spring, TX (US); Po Yu Li, Taipei (TW); Qijun Chen, Spring, TX (US); Fangyong Dai, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/641,934

(22) PCT Filed: Dec. 8, 2017

(86) PCT No.: PCT/US2017/065407
§ 371 (c)(1),
(2) Date: Feb. 25, 2020

(87) PCT Pub. No.: WO2019/112619
PCT Pub. Date: Jun. 13, 2019

(65) Prior Publication Data
US 2020/0295558 A1     Sep. 17, 2020

(51) Int. Cl.
*H02H 3/08*     (2006.01)
*H02H 9/02*     (2006.01)
*G06F 1/30*     (2006.01)
*H02H 1/00*     (2006.01)

(52) U.S. Cl.
CPC ............... *H02H 3/08* (2013.01); *G06F 1/30* (2013.01); *H02H 1/0007* (2013.01)

(58) Field of Classification Search
CPC .......... H02H 3/08; H02H 3/093; H02H 3/087; H02H 1/0007; G06F 1/30
USPC .................................................. 361/93.1
See application file for complete search history.

(56) References Cited

U.S. PATENT DOCUMENTS

| 8,767,418 | B2 | 7/2014 | Jungreis et al. |
| 9,214,804 | B2 | 12/2015 | Persson et al. |
| 2007/0035895 | A1 | 2/2007 | Liu |
| 2007/0247774 | A1 | 10/2007 | Cheng |
| 2011/0141776 | A1 | 6/2011 | Lin |

(Continued)

OTHER PUBLICATIONS

Shi, L-F., et al., Design of a Hiccup Mode Over-current Protection Circuit for Dc-Dc Switching Converters, Jan. 2012, https://www.researchgate.net/publication/22054629_Design_of_a_hiccup_mode_over-current_protection_circuit_for-DC-DC_switching_converters.

(Continued)

*Primary Examiner* — Jared Fureman
*Assistant Examiner* — Lucy M Thomas
(74) *Attorney, Agent, or Firm* — Perry + Currier Inc.

(57) ABSTRACT

An example power adaptor includes a converter and a circuit to detect an overcurrent event at the converter and to pause power output of the converter when the overcurrent event is detected. The circuit is further to count a number of overcurrent events at the converter within a time period. The circuit is further to compare the number of overcurrent events to a threshold number and to switch off the power output of the converter when the number of overcurrent events passes the threshold number.

13 Claims, 7 Drawing Sheets

(56) References Cited

U.S. PATENT DOCUMENTS

2014/0376273 A1\* 12/2014 Hosotani .......... H02M 3/33546
363/21.02
2016/0204632 A1 7/2016 Kleine
2017/0104405 A1 4/2017 Pfof et al.
2017/0231058 A1 8/2017 Sadwick et al.

OTHER PUBLICATIONS

Tps40428 Dual Output, 2-Phase, Stackable PMBUS Synchronous Buck Driverless Controller with Adaptive Voltage Scaling (AVS) Bus (rev. A), Jul. 2014, http://www.ti.com/product/TPS40428/datasheet/detailed_description.

\* cited by examiner

POWER CONTROL WITH DETECTION OF OVERCURRENT EVENTS

BACKGROUND

Power adaptors are used to provide electrical power to a variety of electronic devices, such as computers and the like. A power adaptor typically converts wall or mains power into a form that is useable by the electronic device. This often includes converting alternating current (AC) to direct current (DC). Power adaptors are often removeable from the electronic device by design, and may be sold as a separate component to the electronic device.

DETAILED DESCRIPTION

A power adaptor may experience overcurrent events which may cause heat to build up in the adaptor or may reduce reliability of the adaptor. Heat buildup may damage the adaptor or present a nuisance or risk to users.

A circuit may pause output of the power adaptor, in what may be termed a hiccup mode, when an overcurrent event is detected. Temporarily pausing output of the power adaptor provides a short time for the adaptor to cool and allow any transients to pass. Successive overcurrent events may be counted and when a threshold count is reached, then the power adaptor may shut down, in what may be termed a latch mode. The user may then manually disconnect and reconnect the power adaptor in order to reset the latch mode and allow the adaptor to once again provide power. Hence, the adaptor may be protected against overcurrent, while transients may be accommodated without disruption and while potentially more serious situations may be brought to the user's attention.

Figure 1:
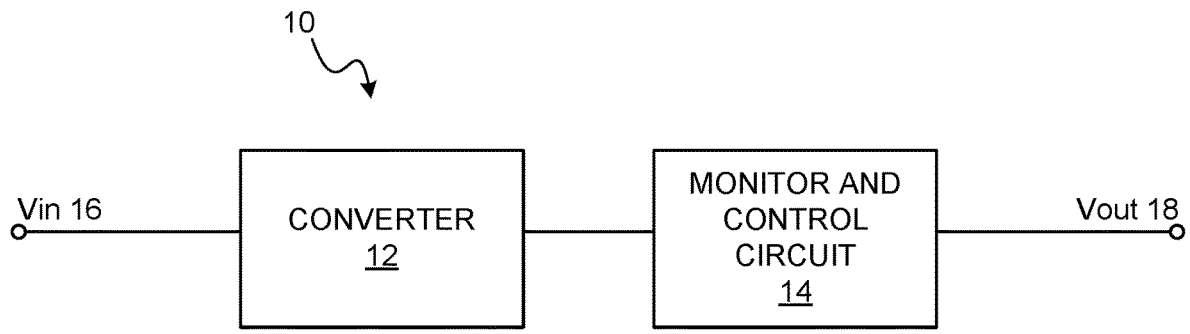
FIG. 1 is a block diagram of an example power adaptor to pause power output during occasional overcurrent events and to shut down power output during continuous overcurrent events.

FIG. 1 shows an example power adaptor 10. The power adaptor 10 may be a barrel-type adaptor, a Power Delivery (PD) adaptor, or the like. The power adaptor 10 includes a converter 12 and a monitor and control circuit 14.

The converter 12 is to convert input power 16 to output power 18. The input power 16 may be provided by an AC power source, which may be external to the power adaptor 10. For example, the power adaptor 10 may be a device that plugs into a consumer power source, such as wall or mains power. The power source may provide input power 16 of 110/120 Volts AC (VAC), 230 VAC, or similar. The output power 18 may be DC at, for example, 5 V, 9 V, 15 V, 20 V, or similar. The converter 12 may be an AC-DC buck boost converter.

The monitor and control circuit 14 is coupled to the converter 12, such that the circuit 14 may control a state of the output power 18. For example, the circuit 14 may be to detect an overcurrent event at the converter 12 and trigger the converter 12 to provide the output power 18 or to cease to provide the output power 18. An overcurrent event may be an instance of current that is excessive to a reference or threshold current.

An overcurrent event may be caused by a short circuit. For example, a plug or receptacle of the power adaptor 10 may be damaged, insulation may be degraded or damaged, a component of the converter 12 or other circuit in the adaptor 10 may be damaged or malfunctioning, or a similar condition may exist.

The monitor and control circuit 14 may be to pause the output power 18 from the converter 12 when an overcurrent event is detected. The circuit 14 may further be to count a number of overcurrent events at the converter 12 within a time period. The circuit 14 may further be to compare the number of overcurrent events within the time period to a threshold number and switch off the output power 18 of the converter 12 when the number of overcurrent events passes the threshold number. As such, a particular overcurrent event may trigger the pausing of power delivery by the converter 12, which may protect a downstream circuit that uses the output power 18 or may protect the adaptor 10 itself. Occasional overcurrent events need not cause the converter 12 to switch off. When a specified number of overcurrent events occur in a specified time period, the output power 18 provided by the converter 12 may be switched off, as the pausing of the output power 18 may not have provided sufficient protection.

The threshold number of overcurrent events and the time period may be selected based on specific implementation requirements. The threshold number may be one or greater such as, for example, five. The time period may be selected from a range of about 50 milliseconds to ten seconds or longer or may not be used at all. Selecting a lower threshold number may increase the responsiveness of the power adaptor 10 to a severe overcurrent condition, whereas selecting a higher threshold number may allow for less disruption to the user in the case of less severe overcurrent conditions. Selecting a longer time period may tend to group overcurrent events together, whereas selecting a shorter time period may tend to consider overcurrent events separately. Omitting use of the time period may mean that the threshold number of overcurrent events applies to the expected service life of the adaptor. The threshold number and the time period may be selected to define a continuous overcurrent condition that may require the power adaptor to be shut down. The degree of continuousness may be selected based on the application for the power adaptor.

Figure 2:
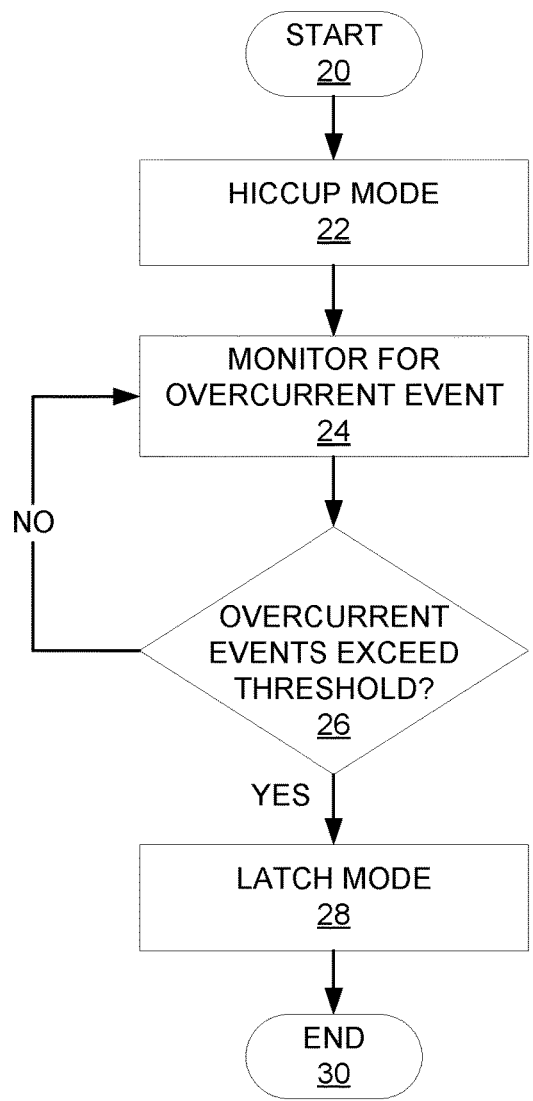
FIG. 2 is a flowchart of an example method to monitor power and control use of a hiccup mode or a latch mode.

FIG. 2 shows a flowchart of an example method to monitor and control power delivery. The method may be performed by any of the circuits discussed herein. For sake of explanation, the monitor and control circuit 14 of FIG. 1 will be referenced. The method starts at block 20.

At block 22, a power adaptor 10 is set to operate in a hiccup mode. This may be the default mode for the power adaptor 10. In the hiccup mode, power output 18 of a converter 12 of the power adaptor 10 may be paused in response to detection of an overcurrent event. The duration of the pause may be, for example, one second, two seconds, five seconds, or similar, after which the adaptor 10 may be reset.

At block 24, the converter 12 is monitored for overcurrent events. Detection of an overcurrent event triggers the hiccup mode to pause power output.

At block 26, a number of overcurrent events within a time period may be counted. Block 26 may be performed in response to each detection of an overcurrent event, at block 24. For each new overcurrent event, a counter may be updated. If the number of overcurrent events within the time period does not pass a threshold number, then the converter 12 continues to be monitored for overcurrent events and the hiccup mode remains active.

In this description, a counter is incremented and the counter is tested against a threshold to determine whether the counter passes the threshold by exceeding the threshold. Equivalently, a counter may be decremented and the counter may be tested against a threshold to determine whether the counter falls below the threshold. Further, a counter may be considered to pass a threshold when the counter equals the threshold. The same applies to other values and respective thresholds discussed herein other than counters.

If the number of overcurrent events within the time period exceeds the threshold number, at block 26, then the power adaptor 10 is set to operate in a latch mode, at block 28, in which the converter 12 is controlled to switch off in response to an overcurrent event. The latch mode disables output of the converter 12 and may be reset by manual disconnection and reconnection of the power adaptor 10. That is, to exit the latch mode, a user may unplug the power adaptor 10 from the device being powered and plug the power adaptor back in to the device.

The method ends at block 30, at which time the power adaptor 10 no longer provides power. A user may disconnect the power adaptor 10 and reconnect the power adaptor 10 to exit the latch mode and restart the method.

Figure 3:
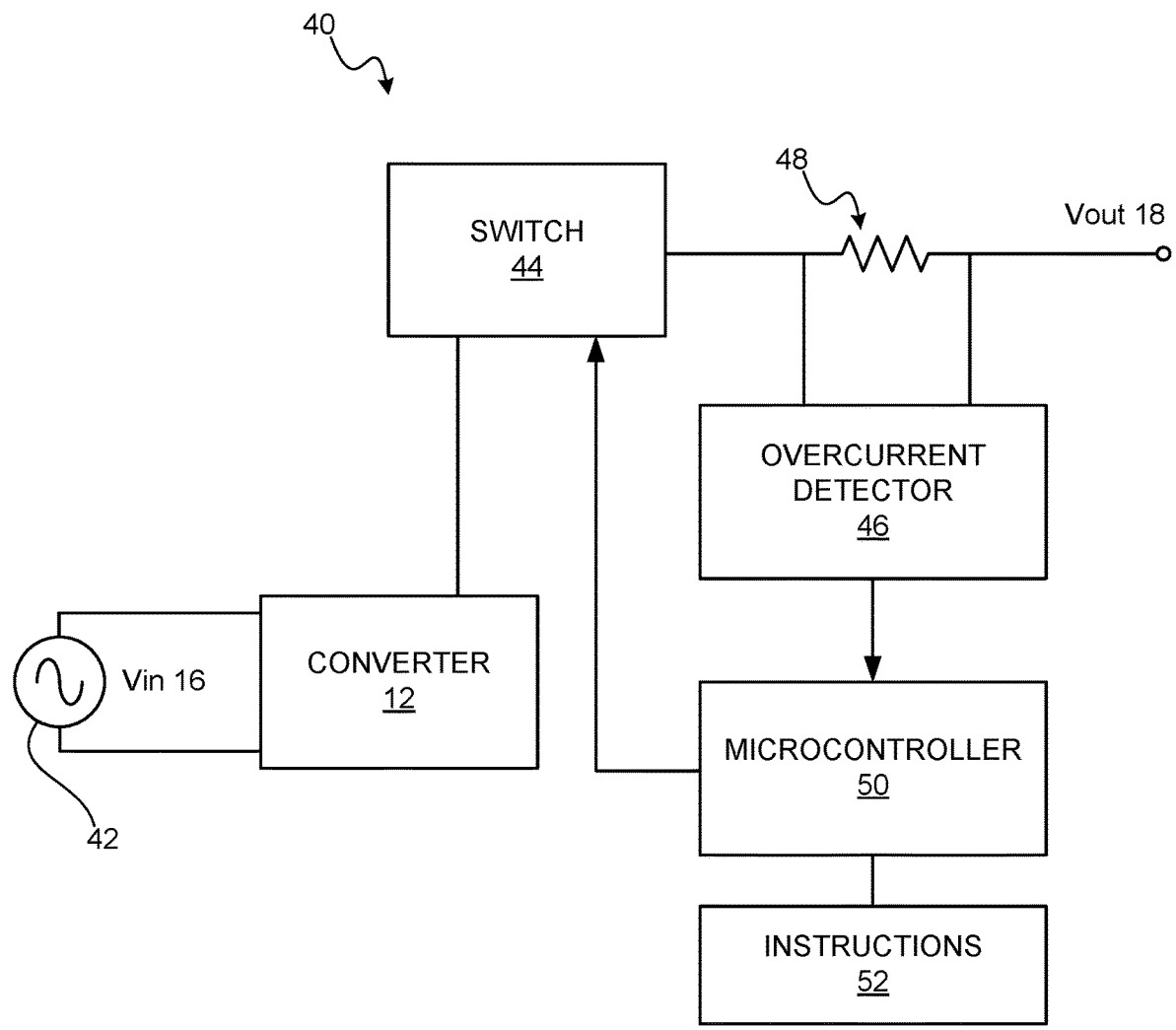
FIG. 3 is a block diagram of another example power adaptor including a microcontroller to pause power output during occasional overcurrent events and to shut down power output during continuous overcurrent events.

FIG. 3 shows another example power adaptor 40. The power adaptor 40 includes a converter 12 and circuitry to monitor and control power delivery based on overcurrent events. The description of the other power adaptors discussed herein may be referenced for features and aspects of the power adaptor 40, particularly for components having like reference numerals.

The converter 12 may be to connect to an external power source 42, such as a wall or mains source of alternating current. The converter 12 may be to convert AC input power 16 to DC output power 18.

The power adaptor 40 may include a switch 44 connected to an output of the converter 12 to toggle the state of the output power 18. The switch 44 may include a transistor, such as a metal-oxide-semiconductor field-effect transistor (MOSFET). In other examples, the switch 44 may be integral to the converter 12.

The power adaptor 40 further includes an overcurrent detector 46 coupled to an output of the switch 44 that provides the output power 18. The overcurrent detector 46 may be to measure a current across a resistor 48 located at the output of the switch 44 and to compare the measured current to a threshold current. The overcurrent detector 46 may be to detect an overcurrent event when the measured current exceeds the threshold current and to output a signal indicative of the overcurrent event. In other examples, other methods of directly or indirectly detecting excessive current may be used, such as by measuring a voltage between two lines that are expected to operate at a voltage differential.

The power adaptor 40 further includes a microcontroller 50 that may have an input connected to the overcurrent detector 46 to receive a signal from the overcurrent detector 46 indicative of an overcurrent event. The microcontroller 50 may further include an output that connects to a control input of the switch 44 to control the switch 44. The input and output of the microcontroller 50 may include terminals, such as pins, leads, solder balls, traces, wires, or the like.

The microcontroller 50 may include or have access to a non-transitory machine-readable storage medium that is encoded with executable instructions. The machine-readable storage medium may include, for example, random access memory (RAM), read-only memory (ROM), electrically-erasable programmable read-only memory (EEPROM), flash memory, and the like. The microcontroller 50 may include processing structure to execute such instructions.

Instructions 52 are provided to detect and count overcurrent events at the power adaptor 40 within a time period. The instructions 52 are further to compare a number of overcurrent events to a threshold number and to cause the microcontroller 50 output a shutdown signal when the number of overcurrent events passes the threshold number. The instruction 52 may be to cause the microcontroller 50 to output the shutdown signal to the switch 44 to command the power adaptor 40 to switch off the converter 12. This may implement what may be referred to as a latch mode that may require that a user physically disconnect the power adaptor 40 from the device being powered to allow the converter 12 to switch on again.

The instructions 52 may further be to output a reset signal to pause power output of the converter in response to detection of an overcurrent event. An overcurrent event that does not trigger shutdown due to continuous overcurrent events may be used instead to trigger temporary shutdown of the converter 12. The reset signal may include a shutdown signal provided to the switch 44 followed by an enable signal provided to the switch 44 after a duration. This may implement what may be referred to as a hiccup mode.

The overcurrent detector 46 may be implemented as a component that is connected to a general-purpose input/output (GPIO) terminal (first terminal) of the microcontroller 50. The connection of the microcontroller 50 to the switch 44, at for example a gate of a MOSFET, may also be via a GPIO terminal.

The microcontroller 50, overcurrent detector 46, and switch 44 may be connected via an Inter-Integrated Circuit (I2C) bus or similar.

Figure 4:
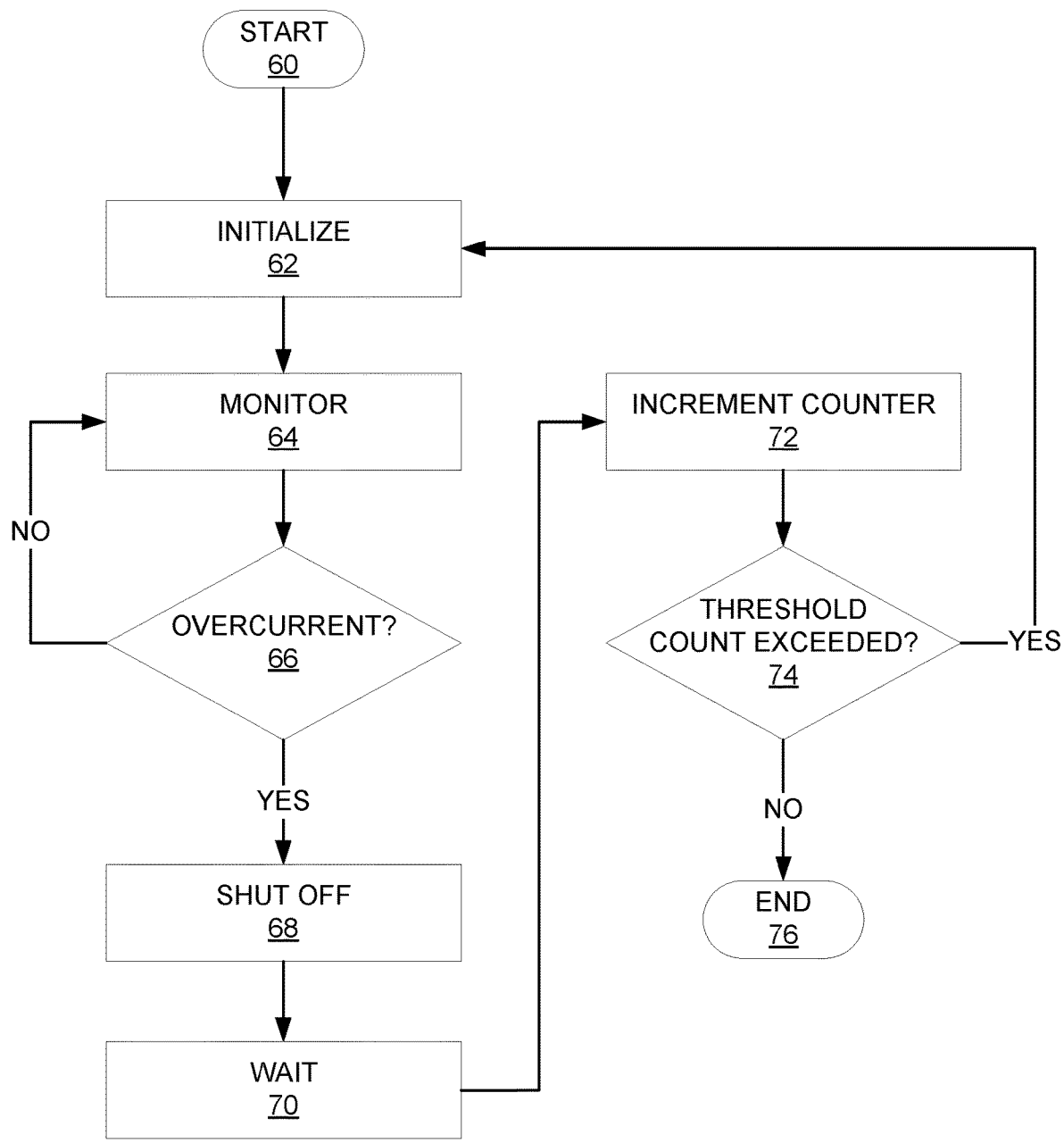
FIG. 4 is a flowchart of another example method to monitor and control power to accommodate overcurrent events.

FIG. 4 shows a flowchart of an example method to monitor and control power delivery. The method may be performed by any of the circuits discussed herein. For sake of explanation, the circuit of FIG. 3 will be referenced. The method starts at block 60, at which a microcontroller 50 may reset a counter representative of a number of overcurrent events.

At block 62, the circuit is initialized. This may include the microcontroller 50 enabling a switch 44 to provide output power from a converter 12. An enable signal may be a particular voltage level. The microcontroller 50 may further set a current threshold within an overcurrent detector 46.

At block 64, current outputted by the converter 12 is monitored for an overcurrent event. This may include the microcontroller 50 monitoring a signal provided by the overcurrent detector 46 for an indication of an overcurrent event at the output of the converter 12.

At block 66, an overcurrent event may be considered to be detected when the overcurrent detector 46 detects a current that exceeds the current threshold. Monitoring at block 64 continues until an overcurrent event is detected.

When an overcurrent event is detected, the output of the converter 12 is switched off, at block 68. This may include the overcurrent detector 46 outputting an indication of an overcurrent event to the microcontroller 50 and the microcontroller 50, in response to the indication, outputting a shutdown signal to the switch 44. Outputting a shutdown signal to the switch 44 may include outputting a disable signal, such as a particular voltage level that is different from the enable signal.

At block 70, after commanding the output of the converter 12 to be shut off, the method may pause. This may include the microcontroller 50 waiting a duration, such as five seconds while the switch 44 is kept off. A pause may provide the converter with time sufficient to reset, in case the converter 12 is to be subsequently switched on.

At block 72, the overcurrent event is tracked. This may include the microcontroller 50 incrementing the counter representative of the number of overcurrent events.

At block 74, the counted number of overcurrent events is compared to a threshold number of allowable overcurrent events. This may include the microcontroller 50 comparing the overcurrent event counter to a threshold count. If the number of past overcurrent events does not pass the threshold number, then the method returns to block 62 to initialize the circuit to prepare to detect another overcurrent event. This may be considered a hiccup mode of overcurrent protection.

If the number of overcurrent events passes the threshold number, at block 74, then the method ends and the converter 12 remains shut down until a user manually disconnects and reconnects the power adaptor to the device being powered. This may be considered a latch mode of overcurrent protection.

The method ends at block 76 and may be restarted at block 60 in response to the user resetting the latch mode by disconnecting and reconnecting the power adaptor 10.

Figure 5:
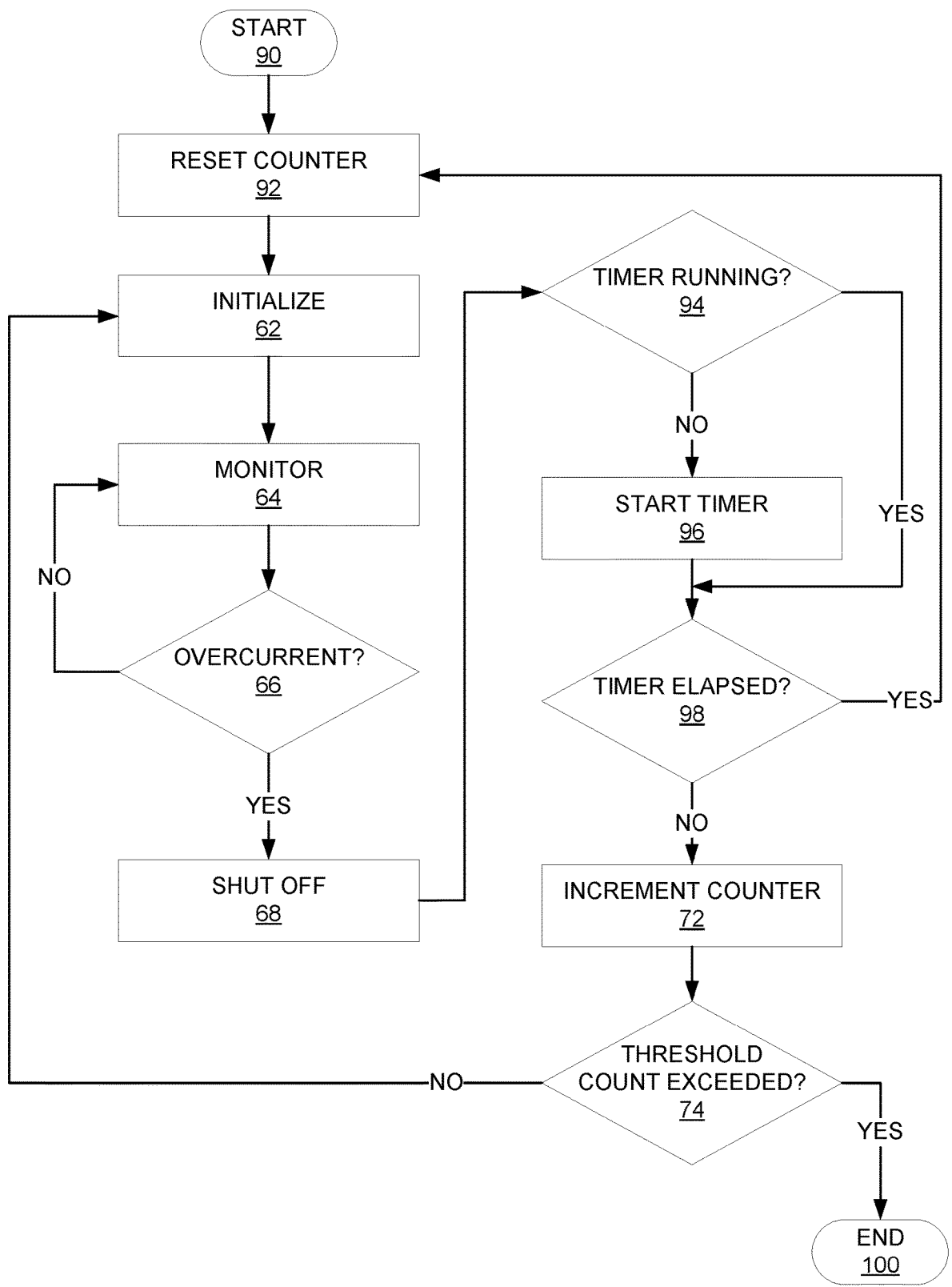
FIG. 5 is a flowchart of another example method to monitor and control power, which uses an example timer to determine continuous overcurrent events.

FIG. 5 shows a flowchart of an example method to monitor and control power delivery with reference overcurrent events within a time period. The method may be performed by any of the circuits discussed herein. For sake of explanation, the circuit of FIG. 3 will be referenced. Further, description for blocks discussed elsewhere will not be repeated. The method starts at block 90.

At block 92, a count of a total number of overcurrent events is reset. This may include a microcontroller 50 resetting a counter to an initial value, such as zero.

The circuit is then initialized and overcurrent events are monitored and detected, at blocks 62, 64, 66. When an overcurrent event is detected, at block 66, then the output of the converter 12 is switched off, at block 68.

After detection of the overcurrent event, it is determined whether a timer has been started, at block 94. This may include the microcontroller 50 checking an internal timer. If the timer is not running, then it is started at block 96. The microcontroller 50 may start the timer as a countdown timer to count down a time period during which successive overcurrent events are considered continuous.

At block 98, it is determined whether the timer has elapsed. That is, it is determined whether or not the most recently detected overcurrent event is continuous with any previously detected overcurrent events. This may include the microcontroller 50 checking that its internal timer has not yet elapsed. If the timer has elapsed, then the method returns to block 92 to reset the counter to begin detection of overcurrent events that may be continuous.

If the timer has not yet elapsed, then at block 72 the counter is incremented. That is, the most recently detected overcurrent event may be counted as continuous with any previously detected overcurrent events.

Then, at block 74, the total number of overcurrent events is compared to a threshold count. If the total number passes the threshold, then the continuous overcurrent events are sufficient to end the method, at block 100, thereby keeping the converter 12 in the shutdown state. If the count does not yet pass the threshold, then the method returns to block 62 to initialize in preparation to detect another overcurrent event which may be continuous with any already detected overcurrent events within the current time period.

Figure 6:
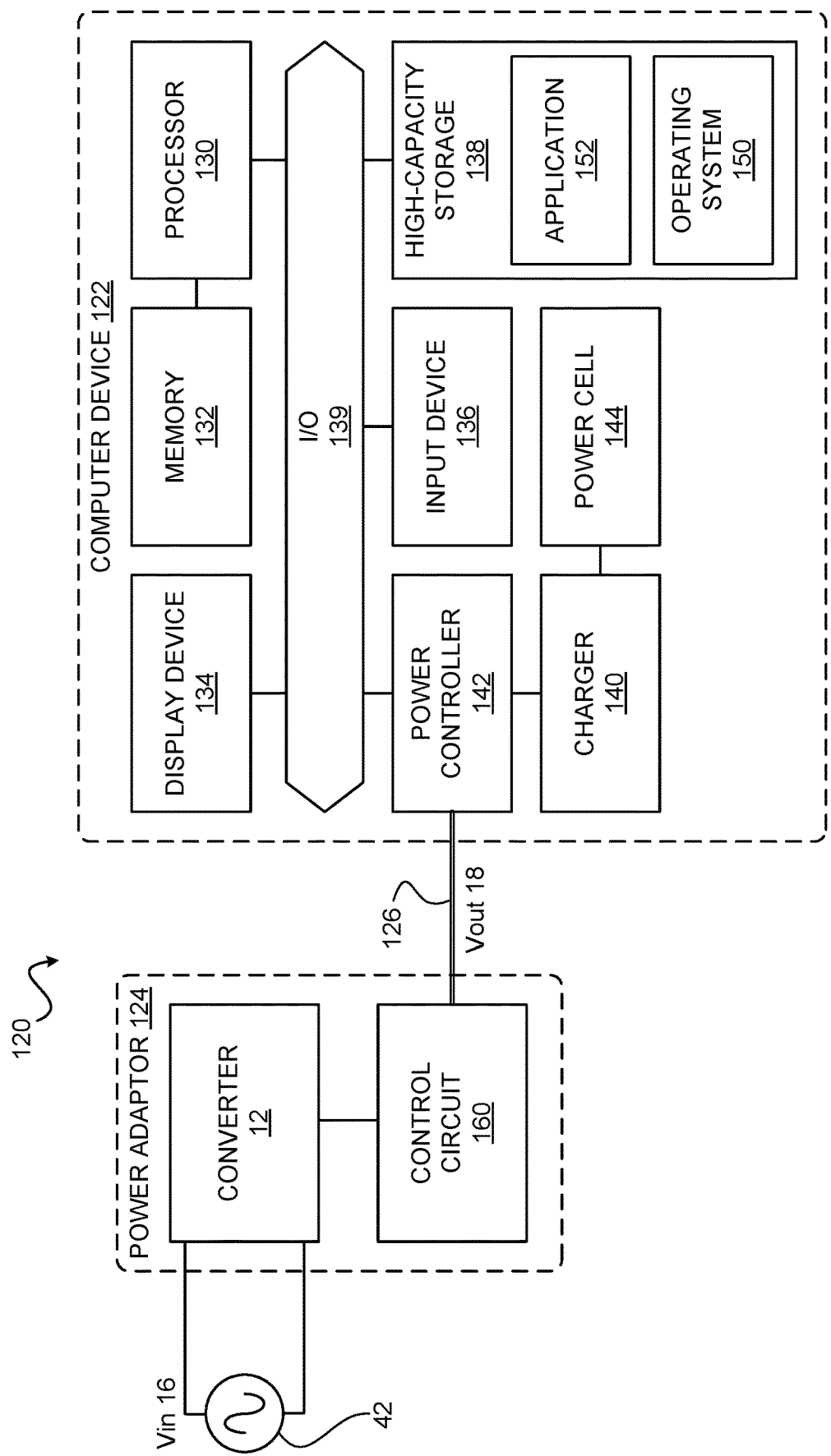
FIG. 6 is a block diagram of an example system including an example computer device and an example power adaptor to accommodate occasional and continuous overcurrent events.

An example system 120 is shown in FIG. 6. The system 120 may include a computer device 122 and a power adaptor 124 to provide output power 18 to the computer device 122. The power adaptor 124 may be connected to the computer device 122 by a conductor 126, such as a power cord or cable, which may include a plug, receptacle, connector, or similar. The conductor 126 may provide a manually removable connection of the power adaptor 124 to the computer device 122.

The power adaptor 124 may be connectable to a power source 42, such as wall or mains AC power, to receive input power 16 to be converted into output power 18. The connection of the power adaptor 124 to the power source 42 may be manually removable and may include a plug, receptacle, cord, cable, connector, or similar.

The computer device 122 may be a notebook computer, a desktop computer, a smartphone, a tablet computer, a server, a printer, or the like. The computer device 122 may include a processor 130, memory 132, a display device 134, an input device 136, high-capacity storage 138, an input/output (IO) interface 139, a charger 140, a power controller 142, and a power cell 144.

The processor 130 may include a central processing unit (CPU), a microcontroller, a microprocessor, a processing core, a field-programmable gate array (FPGA), or similar. The processor 130 may execute instructions stored in memory 132 and high-capacity storage 138, such as instructions to execute an operating system 150 and an application 152. The memory 132 may include RAM or similar non-transitory machine-readable storage medium capable of storing executable instructions. The memory 132 may further include ROM, flash memory, EEPROM, or the like to store a Basic Input/Output System (BIOS) or Extensible Firmware Interface (EFI). The high-capacity storage 138 may include a hard drive, flash memory, a solid-state drive, or similar non-transitory machine-readable storage medium capable of storing executable instructions in the absence of electrical power.

The display device 134 may include a graphics controller, graphics processor, graphics memory, a monitor, a touchscreen, and similar. The display device 134 may be to output a user interface, such as a graphical user interface.

The input device 136 may include a keyboard, a mouse, a touchscreen, or similar. The input device 136 may be to receive user input to the user interface.

The I/O interface 139 may include a northbridge, a southbridge, a bus, and similar. The I/O interface 139 may provide for communications among the components of the computer device 122, such as the processor 130, display device 134, input device 136, high-capacity storage 138, and power controller 142.

The charger 140 may include a circuit that provides power from the power adaptor 124 to the power cell 144, which may be provided in a removable battery, so as to recharge the power cell 144.

The power controller 142 may include a circuit to connect to the power adaptor 124 and receive power from the power adaptor 124. The power controller 142 may control the provision of power to the charger 140 and to other components of the computer device 122. The power controller 142 may include a microcontroller, such as an embedded controller, a PD controller, or similar device capable of executing instructions stored at the power controller 142 or elsewhere in the computer device 122. The power controller 142 may include a first terminal to communicate with the control circuit 160 of the power adaptor 124 via the conductor 126. The power controller 142 may include a second terminal connected to the I/O interface 139 to communicate with other components of the computer device 122.

The power adaptor 124 includes a converter 12 and may include a control circuit 160 to provide output power 18. The description of the other power adaptors discussed herein may be referenced for features and aspects of the power adaptor 124, particularly for components having like reference numerals.

The control circuit 160 may include a microcontroller or the like. The control circuit 160 may include a second terminal to communicate with the processor 130 of the computer device 122 via the conductor 126, the power controller 142, and I/O interface 139.

The control circuit 160 of the power adaptor 124, the power controller 142 of the computer device 122, or both the control circuit 160 and the power controller 142 may be to provide power to the computer device 122 conditional on any overcurrent events. Features and aspects of other circuits, such as the circuit 14 and monitor and control components of the adaptor 40, may be used in the control circuit 160, the power controller 142, or both. One or both of the control circuit 160 and the power controller 142 may implement any of the methods discussed herein.

For example, the control circuit 160 may be to enable the hiccup mode and disable the latch mode in response to no detection of continuous overcurrent events at the power adaptor 124. Further, the control circuit 160 may be to disable the hiccup mode and enable the latch mode in response to detection of continuous overcurrent events at the power adaptor 124.

Figure 9:
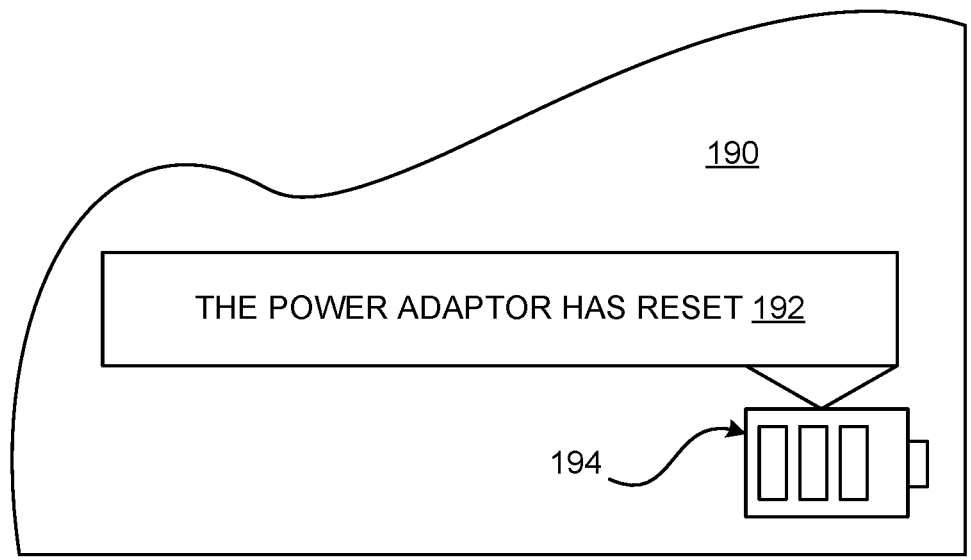
FIG. 9 is a schematic diagram of an example reset notification for an occasional overcurrent event.

In the hiccup mode, the control circuit 160 may be to communicate a signal indicative of the pause of power output of the converter 12 to the power controller 142 of the computer device 122. In response, the power controller 142 may provide a pause indication to the processor 130 to trigger a notification to the user via the display device 134. The signal may be termed a reset signal and the notification may be a reset notification, which may include text or graphics, as shown in FIG. 9, to alert the user to an overcurrent event that triggered the converter to reset via the hiccup mode.

Figure 10:
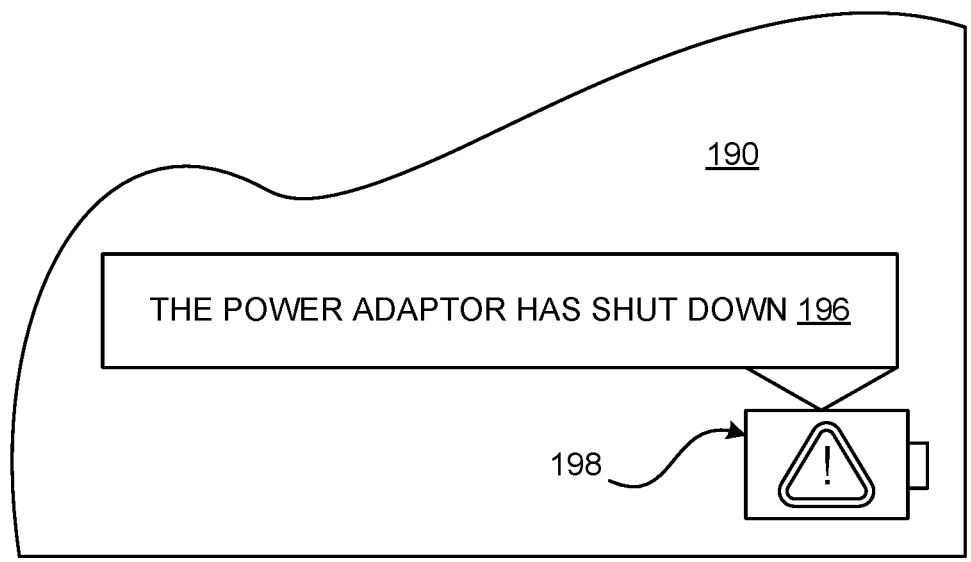
FIG. 10 is a schematic diagram of an example shutdown notification for continuous overcurrent events.

In the latch mode, the control circuit 160 may be to communicate a signal indicative of the shutdown of the converter 12 to the power controller 142 of the computer device 122. In response, the power controller 142 may provide a shutdown indication to the processor 130 to trigger a notification to the user via the display device 134. The signal may be termed a shutdown signal and the notification may be a shutdown notification, which may include text or graphics, as shown in FIG. 10, to inform the user that the power adaptor 124 is no longer providing power to the computer device 122.

In the above example, the control circuit 160 monitors and controls power delivery to the computer device 122, while the power controller 142 informs the computer device 122 of any overcurrent events.

In another example, the power controller 142 may be to enable the hiccup mode and disable the latch mode in response to no detection of continuous overcurrent events at the power adaptor 124. Further, the power controller 142 may be to disable the hiccup mode and enable the latch mode in response to detection of continuous overcurrent events at the power adaptor 124. That is, the power controller 142 may execute instructions to monitor the conductor 126 for overcurrent events and detect continuous overcurrent events with reference to a threshold number of overcurrent events.

In the latch mode, the power controller 142 may execute instructions to output a reset signal to the control circuit 160 of the power adaptor 124 to temporarily pause power output of a converter 12 in response to detection of an overcurrent event that does not cause a threshold number to be passed. The reset signal may include a signal to shut down the converter 12 followed by another signal to restart the converter 12. The effect the latch mode, the power controller 142 may execute instructions to output a shutdown signal to the control circuit 160 to command the power adaptor 124 to switch off the converter 12.

The control circuit 160 may execute instructions to respond to signals received from the power controller 142 to control the converter 12 accordingly.

The power controller 142 may execute instructions to trigger a reset notification, a shutdown notification, or both notifications at the display device 134, as discussed above.

In the above example, the power controller 142 monitors and commands power delivery to the computer device 122 and informs the computer device 122 of any overcurrent events, while the control circuit 160 controls power delivery within the power adaptor 124 in response to signals received from the power controller 142.

In another example, the control circuit 160 includes a switch and omits the instructions discussed above, and the power controller 142 controls the converter 12 directly via the switch.

In other examples, the described functionality may be divided between the power controller 142 and the control circuit 160 in other ways.

Figure 7:
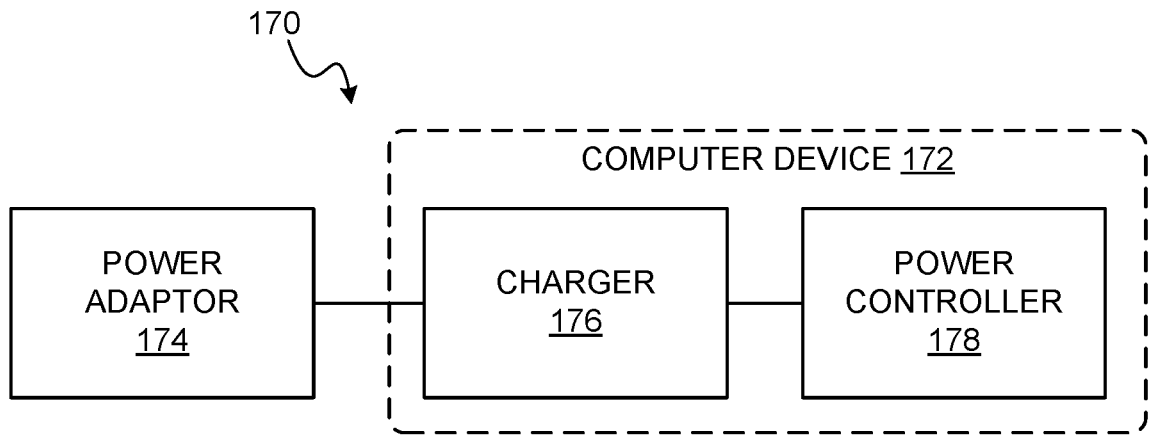
FIG. 7 is a block diagram of another example system, which includes an example computer device without an adaptor controller.

FIG. 7 shows another example system 170. The system 170 may include a computer device 172 and a power adaptor 174 to provide power to the computer device 172. The power adaptor 174 may lack integrated power control and may be a barrel-type adaptor.

The computer device 172 includes a charger 176 and a power controller 178 connected to the charger 176 and may further include other components discussed herein. When the power adaptor 174 is connected to the charger 176, the power adaptor 174 provides power to the charger 176 to, for example, charge a cell of the computer device 172. The power adaptor 174 may connect to the charger 176 via a power line, a ground line, and an I/O line.

The power controller 178 may be a microcontroller that executes instructions to monitor the I/O line at the charger 176 to detect an overcurrent event. For example, the I/O line may go high during or after an overcurrent event. The power controller 178 further includes instructions to detect and count continuous overcurrent events and enable a hiccup mode or latch mode, as discussed elsewhere herein, at the charger 176, the power adaptor 174, or both the charger 176 and the power adaptor 174.

Figure 8:
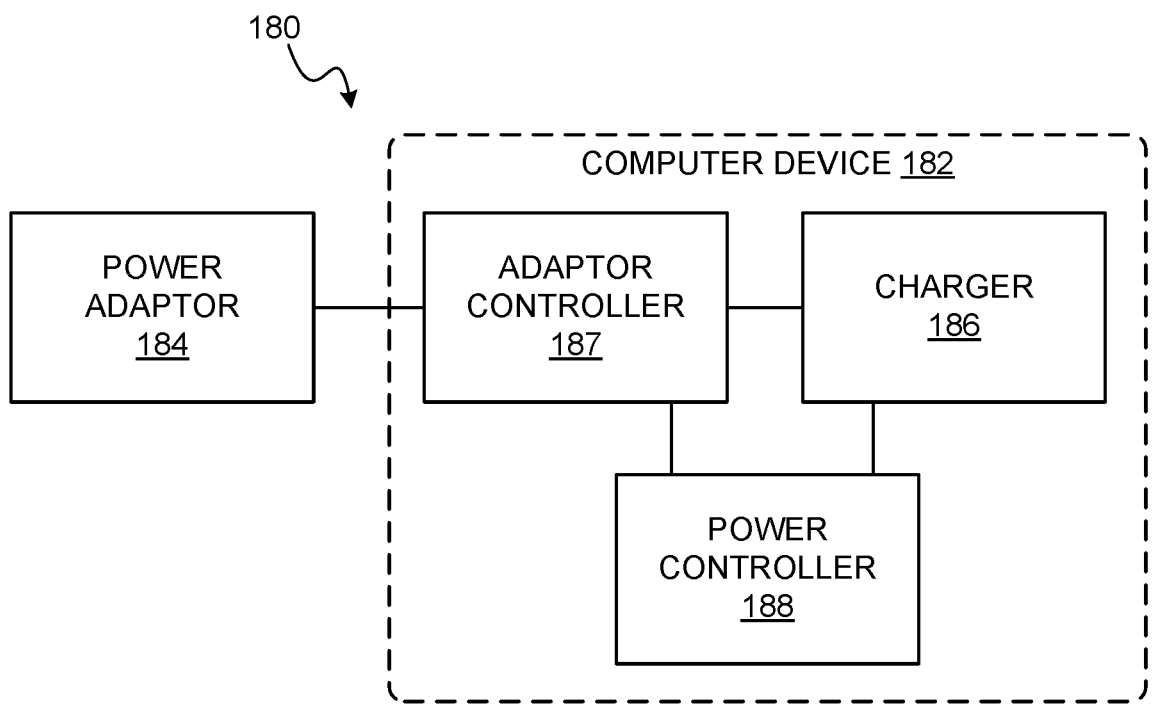
FIG. 8 is a block diagram of another example system, which includes an example computer device with an example adaptor controller.

FIG. 8 shows another example system 180. The system 180 may include a computer device 182 and a power adaptor 184 to provide power to the computer device 182. The power adaptor 184 may be a PD adaptor.

The computer device 182 includes a charger 186, an adaptor controller 187, and a power controller 188 connected to the charger 186 and the adaptor controller 187. The computer device 182 may further include other components discussed herein. When the power adaptor 184 is connected to the adaptor controller 187, the adaptor controller 187 controls the power adaptor 184 to provide power to the charger 186 to, for example, charge a cell of the computer device 182. The adaptor controller 187 may be a PD controller.

The power controller 188 may be a microcontroller that executes instructions to monitor the adaptor controller 187 to detect an overcurrent event. In the example of a PD adaptor, a Vbus level may drop during or after an overcurrent event. The power controller 188 further includes instructions to detect and count continuous overcurrent events and enable a hiccup mode or latch mode, as discussed elsewhere herein, via the adaptor controller 187.

FIG. 9 shows an example reset notification that may be displayed at a display device 190 of a computer device. The reset notification may include one or both of a text notification 192 and a graphical notification 194.

FIG. 10 shows an example shutdown notification that may be displayed at a display device 190 of a computer device. The shutdown notification may include one or both of a text notification 196 and a graphical notification 198.

It should be apparent from the above, that occasional and continuous overcurrent conditions may be handled differently while providing efficient operation and reducing a need for user intervention. A hiccup mode and a latch mode may be selected between based on overcurrent history. A latch mode need not be enabled until a hiccup mode has been attempted.

It should be recognized that features and aspects of the various examples provided above can be combined into further examples that also fall within the scope of the present disclosure.

The invention claimed is:

1. A power adaptor to provide output power to a device in a hiccup mode and a latch mode, the power adaptor comprising:
   a converter; and
   a circuit to:
      detect an overcurrent event at the converter
      enable the hiccup mode in response to the overcurrent event,
      when in the hiccup mode, pause power output of the converter when the overcurrent event is detected
      count a total number of overcurrent events at the converter within a time period;
      compare the total number of overcurrent events to a threshold number,
      disable the hiccup mode and enable the latch mode in response to the total number of overcurrent events passing the threshold number;
      when in the latch mode, switch off the power output of the converter when the total number of overcurrent events passes the threshold number; and
      disable the latch mode when the power adaptor is manually disconnected and reconnected to the device.

2. The power adaptor of claim 1, wherein the circuit is to communicate a signal indicative of the pause of power output of the converter to a microcontroller of a computer device connected to the power adaptor.

3. The power adaptor of claim 1, wherein the circuit is to communicate a signal indicative of the switch off of the converter to a microcontroller of a computer device connected to the power adaptor.

4. A microcontroller comprising:
   a first terminal to communicate with a power adaptor, the power adaptor to provide power to a device in a hiccup mode and a latch mode; and
   a second terminal to communicate with a processor of a computer device, the microcontroller to:
      determine an overcurrent event at the power adaptor;
      enable the hiccup mode and disable the latch mode in response to the overcurrent event;
      when in the hiccup mode, pause power output when the overcurrent event is detected;
      count a total number of overcurrent events at the power adaptor within a time period;
      compare the total number of overcurrent events to a threshold number;
      disable the hiccup mode and enable the latch mode in response to the total number of overcurrent events passing the threshold number;
      when in the latch mode, output a shutdown signal when the total number of overcurrent events passes the threshold number; and
      disable the latch mode when the power adaptor is manually disconnected and reconnected to the device.

5. The microcontroller of claim 4, wherein the microcontroller is to output the shutdown signal to the power adaptor to command the power adaptor to switch off a converter.

6. The microcontroller of claim 4, wherein the microcontroller is to output the shutdown signal to trigger the computer device to output a power shutdown notification at a user interface of the computer device.

7. The microcontroller of claim 4, wherein the microcontroller is to output a reset signal to the power adaptor to pause power output of a converter in response to detection of the overcurrent event.

8. The microcontroller of claim 4, wherein the microcontroller is to output a reset signal in response to detection of the overcurrent event, the reset signal to trigger the computer device to output a reset notification at a user interface of the computer device.

9. A device comprising:
   a power adaptor to provide output power in a hiccup mode and a latch mode, the power adaptor to output power to charge a cell; and
   a circuit to enable the hiccup mode and disable the latch mode in response to no detection of a total number of overcurrent events that exceeds a threshold number within a time period at the power adaptor, the circuit to disable the hiccup mode and enable the latch mode in response to detection of the total number of overcurrent events at the power adaptor that exceeds the threshold number within the time period, the circuit further to disable the latch mode when the power adaptor is manually disconnected and reconnected to the device.

10. The device of claim 9, wherein the circuit comprises a microcontroller and an overcurrent detector connected to the microcontroller.

11. The device of claim 9, wherein the circuit is integrated with the power adaptor.

12. The device of claim 9, wherein the circuit is to trigger an indication of the hiccup mode, the latch mode, or both the hiccup mode and the latch mode at a user interface of a computer device to be connected to the power adaptor.

13. The device of claim 9, wherein the circuit is to detect the continuous overcurrent events with reference to a threshold number of overcurrent events.

* * * * *